United States Patent [19]

Lamb

[11] Patent Number: 5,712,519
[45] Date of Patent: Jan. 27, 1998

[54] MAGNETIC POWER TRANSFER SYSTEM

[75] Inventor: Karl J. Lamb, Port Angeles, Wash.

[73] Assignee: Magna Force, Inc., Port Angeles, Wash.

[21] Appl. No.: 616,905

[22] Filed: Mar. 15, 1996

Related U.S. Application Data

[63] Continuation-in-part of Ser. No. 546,066, Oct. 20, 1995, Pat. No. 5,668,424, which is a continuation of Ser. No. 237,031, May 3, 1994, Pat. No. 5,477,094, which is a continuation-in-part of Ser. No. 65,867, May 21, 1993, Pat. No. 5,477,093.

[51] Int. Cl.$^6$ .................................................. H02K 7/10
[52] U.S. Cl. .................. 310/75; 310/75 R; 310/77; 310/78; 310/84; 310/102; 310/103; 310/114; 192/84 PM; 192/84 A
[58] Field of Search .................... 310/75 R, 77, 310/78, 84, 102, 103, 114; 192/84 PM, 84 A

[56] References Cited

U.S. PATENT DOCUMENTS

| | | | |
|---|---|---|---|
| 3,573,517 | 4/1971 | Osterstom | 310/103 |
| 4,152,617 | 5/1979 | Janson | 310/103 |
| 4,826,150 | 5/1989 | Minoura | 272/73 |
| 4,876,471 | 10/1989 | Lacour | 310/105 |
| 4,896,754 | 1/1990 | Carlson et al. | 192/21.5 |
| 5,013,949 | 5/1991 | Mabe, Jr. | 310/83 |
| 5,099,974 | 3/1992 | Spechko | 192/415 |
| 5,105,928 | 4/1992 | Saeki et al. | 192/84 |
| 5,264,755 | 11/1993 | Hettlage et al. | 310/328 |
| 5,318,245 | 6/1994 | Sato et al. | 242/288 |
| 5,396,140 | 3/1995 | Goldie et al. | 310/268 |

Primary Examiner—Clayton E. LaBalle
Assistant Examiner—Elvin G. Enad
Attorney, Agent, or Firm—Seed and Berry LLP

[57] ABSTRACT

A power transfer assembly has a magnet rotor with permanent magnets co-acting with a pair of electroconductive rings on a conductor rotor. The rotary axes of the two rotors are in laterally spaced parallel relation with one of the rotors being greater in diameter than the other.

9 Claims, 5 Drawing Sheets

MAGNETIC POWER TRANSFER SYSTEM

CROSS-REFERENCE

This application is a continuation-in-part of my application Ser. No. 08/546,066, filed Oct. 20, 1995, now U.S. Pat. No. 5,668,424 which is a continuation of the application Ser. No. 08/237,031 filed May 3, 1994 now issued as U.S. Pat. No. 5,477,094 issued Dec. 19, 1995 which is a continuation-in-part of Ser. No. 08/065,867 filed May 21, 1993, now issued as U.S. Pat. No. 5,477,093 issued Dec. 19, 1995.

TECHNICAL FIELD

This invention relates to permanent magnet drive systems of the type shown in my prior U.S. Pat. No. 5,477,094 in which permanent magnets on a magnet rotor co-act with electroconductive elements on a conductor rotor by way of eddy currents induced in the electroconductive elements by the magnetic flux from the magnets when their is relative motion between the rotors.

BACKGROUND OF THE INVENTION

My prior U.S. Pat. No. 5,477,094 discloses a permanent magnetic drive arrangement for providing a speed ratio between the magnet rotor and conductor rotor in the described system. In that arrangement the rotary axes of the magnet rotor and conductor rotor are spaced apart a greater distance than the radius of the larger of these rotors. The orbit of the magnets on the magnet rotor overlaps the orbits of the conductor elements. In some instances it is preferred to have a more compact assembly than previously disclosed.

SUMMARY OF THE INVENTION

In accordance with the present invention one or more magnet rotors are located within the confines of a conductor rotor with their respective rotary axes in parallel laterally spaced relation. If more than one magnet rotor is provided they may have a peripheral gear meshing with a central idler. Where multiple speed ratios are desired the magnet rotors may have different effective diameters.

DETAILED DESCRIPTION OF THE INVENTION

Figure 1:
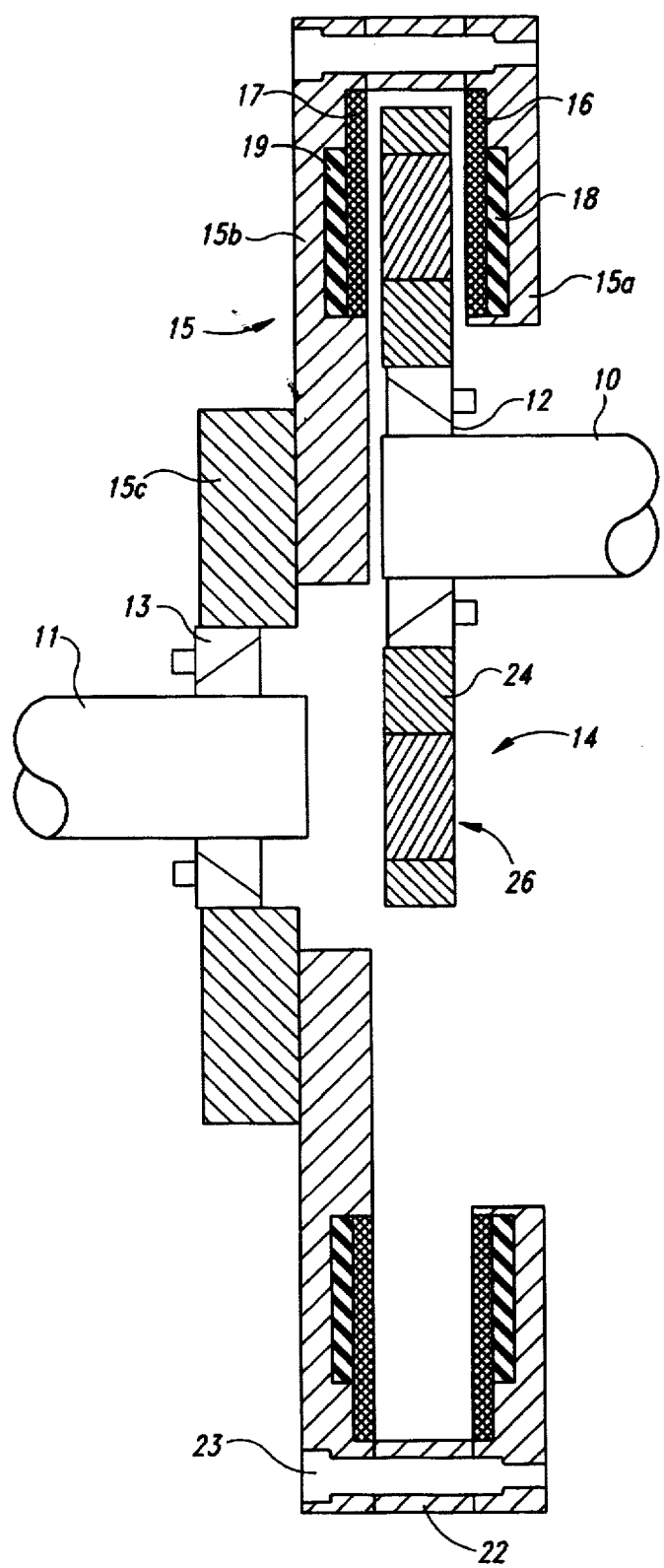
FIG. 1 is a longitudinal cross-sectional view through a first embodiment of my invention.

Referring to the drawings, shafts 10–11 are connected by couplings 12–13 to a magnet rotor unit 14 and conductor rotor unit 15. The conductor rotor unit presents two axially spaced flat rings (continuous bands) 16–17 having good electroconductive characteristics such, for example, as copper or aluminum. These rings 16–17 have ferrous backing rings 18–19, preferably of mild steel. The ferrous backing 18–19 for the electroconductive rings 16–17, and the electroconductive rings 16–17, are mounted on a support ring 15a and a support plate 15b having a hub 15c receiving the coupling 13. Spacers in the form of sleeves 22 separate the members 15a–15b and they are held by bolts 23 passing through the sleeves and the members 15a–15b.

Figure 2:
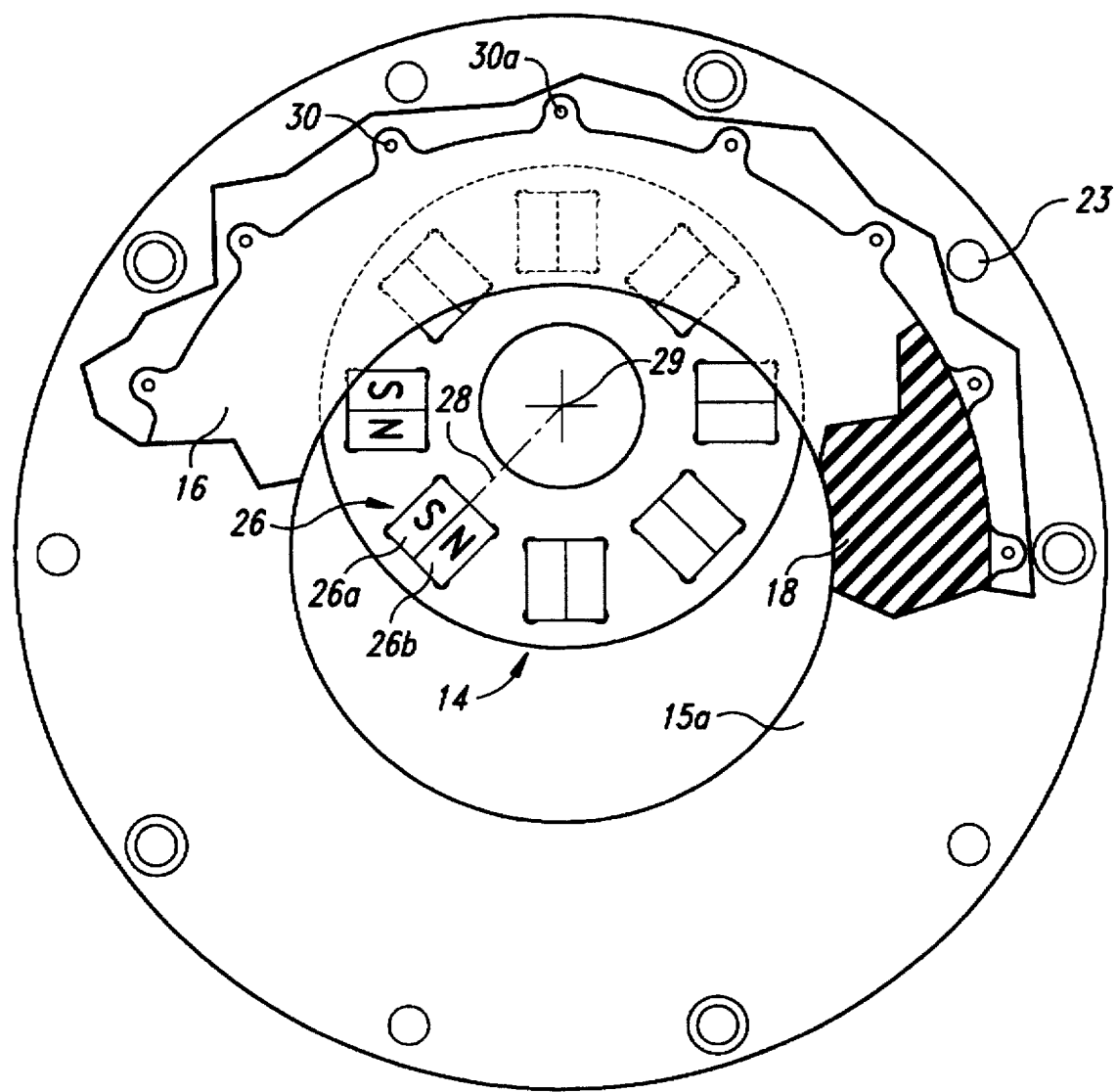
FIG. 2 is a fragmentary elevational view with parts broken away looking to the left from the right hand side of FIG. 1.

The magnet rotor 14 unit includes a disc 24 having sets 26 of permanent magnets 26a–26b mounted in rectangular opening 27 in the disc. The magnets 26a–26b in each set 26 are arranged so that the poles of each magnet 26a have their polarity reversed relative to like facing poles of each magnet 26b. Hence, the magnet poles facing the electroconductive ring 16 alternate in polarity around the magnet rotor 14, and the same is true of the magnet poles facing the electroconductive ring 17. Furthermore, as indicated in FIG. 2, the longitudinal side faces of the magnets in each set 26 which face one another define a neutral plane 28 therebetween which extends radially from the rotary axis 29 of the shaft 10 for maximum performance of the magnets. The disc 24, support ring 14a, spacers 22, support plate 14b and hub 14c are preferably aluminum.

The support members 15a–15b are formed with like annular recesses of a thickness to receive respective of the backing rings 18–19 and electroconductive rings 16–17 in stacked relation. It is preferred to have the mouth of the recesses countersunk with a pattern of indentations to receive matching lobes 30 provided at the outer border of the electroconductive rings 16–17 so as to extend beyond the outer marginal edge of the backing 18–19. Mounting screws extend through holes 30a in the lobes 30 into the support members 15a–15b. Either of the shafts 10–11 can be a power input shaft 11 or an output shaft. The shaft 10 turns at a greater speed than the shaft as determined by the ratio of the effective diameter of the conductor rotor 15 to the magnet rotor 14. The effective diameter of the magnet rotor 14 is measured from a circle centered on the rotary axis of the shaft 10 and passing through the center of the meeting faces of the magnets 26a, 26b in each set 26 at the respective neutral plane 28. The effective diameter of the conductor rotor 15 is measured from the largest circle centered on the rotary axis of the shaft 11 which will have point contact with the previously described circle which is centered on the rotary axis of shaft 10. The actual speed ratio between the shafts 10–11 may vary slightly from that determined in the aforesaid manner depending upon the magnet shapes and arrangements and the amount of slip between the rotors 14–15.

In a further embodiment of the invention (FIG. 3) a conductor rotor unit 15' is provided like the rotor unit 15, but having an intermediate support ring 15d added which has recesses on its opposite sides receiving electroconductive rings 16', 17' and ferrous backing rings 18', 19'. Additional spacer sleeves 22' are provided in alignment with the spacer sleeves 22. Tie bolts 23 passing through the spacers 22, 22' and through registering openings in the outer and intermediate support rings 15a, 15d and support disc 15b hold these parts together as a unit. A complementing magnet rotor unit 14' with a pair of magnet carrying discs 24, 24' is provided for use with the conductor unit 15'.

Figure 4:
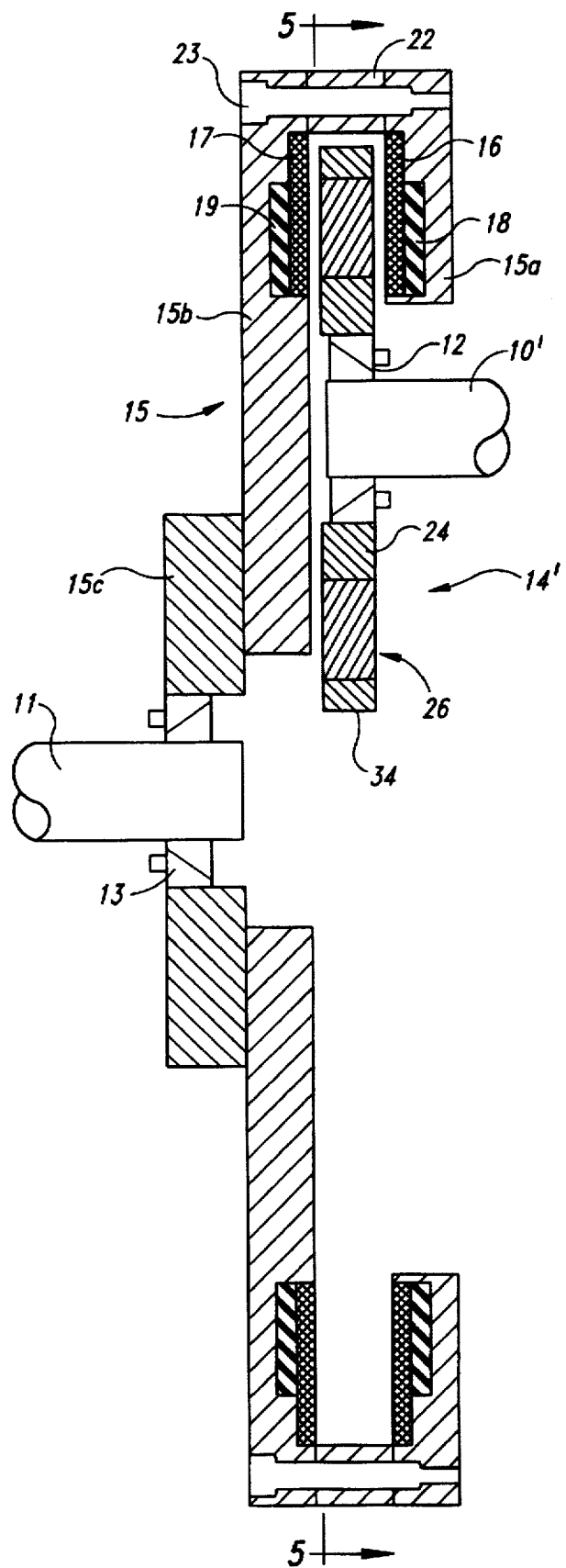
FIG. 4 is a longitudinal sectional view of another embodiment having multiple magnet rotors and is taken as indicted by line 4—4 in FIG. 5, but without showing the idler gear and related magnet rotors.
Figure 5:
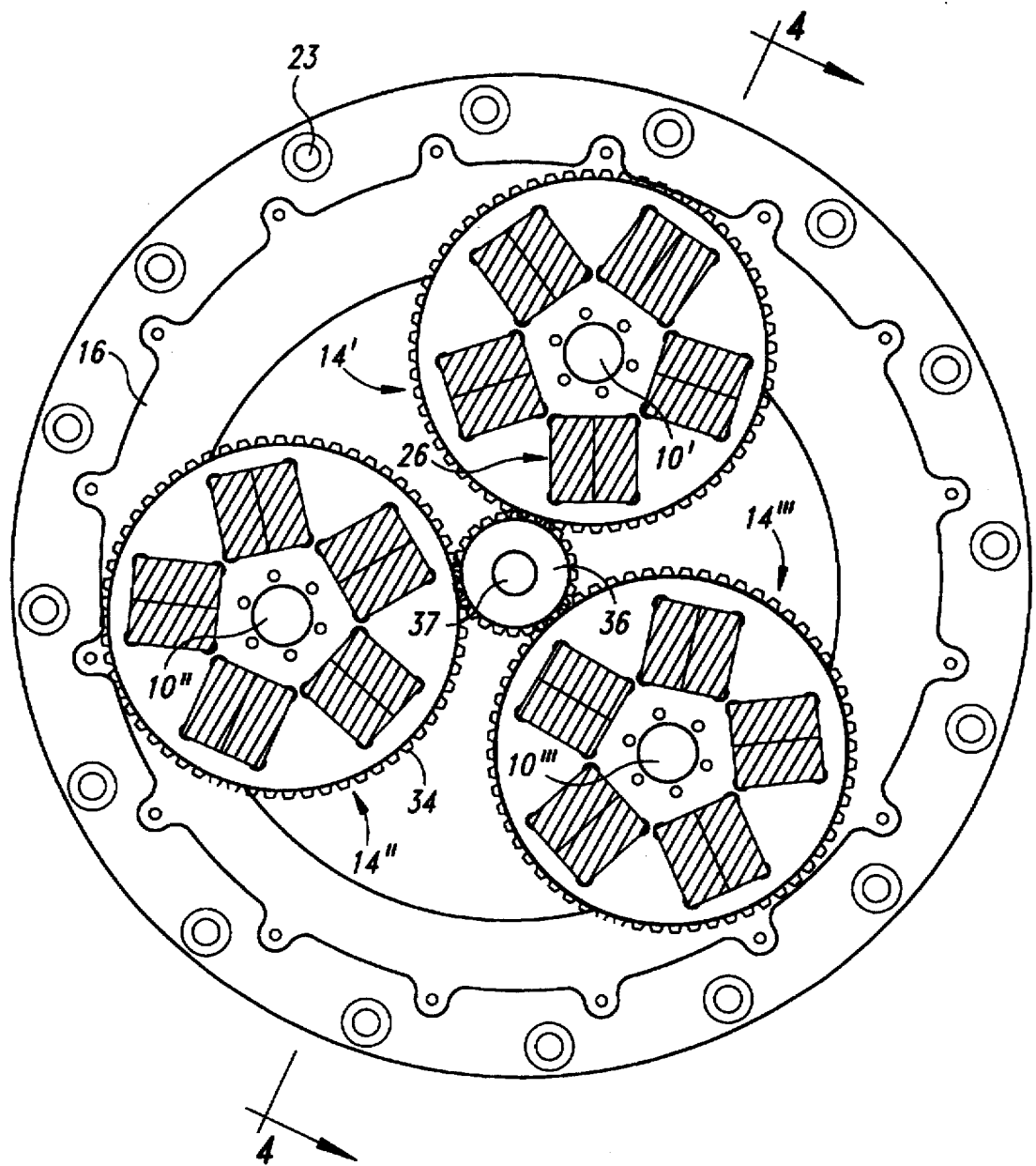
FIG. 5 is a transverse sectional view taken as indicated by line 5—5 in FIG. 4.

Referring to FIGS. 4–5, a further embodiment of the invention is shown in which the conductor rotor 15 has been radially expanded and interleaves with three magnet rotors 14', 14" and 14'" on respective shafts 10', 10" and 10'". These rotors are like the magnet rotor 14, but each have gear teeth 34 around their periphery. The three magnet rotors mesh with an idler 36 mounted on a center shaft 37.

Figure 3:
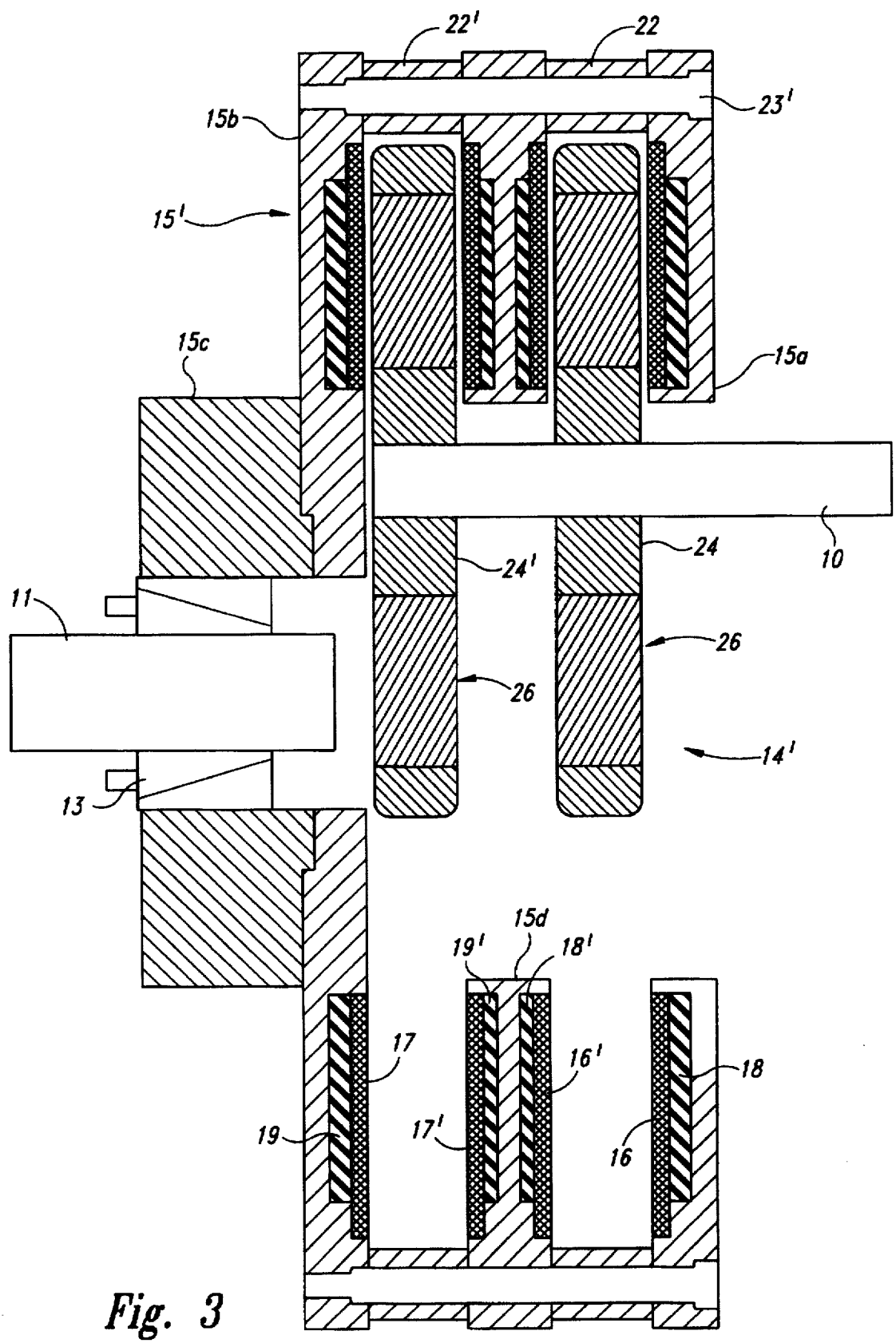
FIG. 3 is a cross-sectional view of a second embodiment taken like FIG. 1.

It will be apparent that if any of the shafts 10', 10" 10'", 37 or 11 are driven the remainder of the shafts will responsively rotate as output shafts because of the interaction of the sets of magnets 26 on the magnet rotors with the conductor rings 16–17. A conductor rotor with multiple pairs of electroconductive rings such as the rotor 15' (FIG. 3) may be used in which case each of the magnet rotors 14', 14" and 14'" may be dual rotors such as shown in FIG. 3.

Three magnet rotors have been shown for purposes of example in FIG. 5. It will be appreciated that more or less magnet rotors can be provided depending upon space restrictions and the number of power takeoffs that may be required. The pinion 36 may be eliminated and the magnet rotors may have different effective diameters to provide different speed ratios between the conductor rotor shaft 10 and the magnet rotor shafts. Although not the preferred embodiment, it will be appreciated that the FIG. 1 assembly, for example, can be altered to make the rotor 15 a magnet rotor and rotor 14 a conductor rotor. This is done by mounting sets 26 of magnets on the ring 15a and straddling the ring 15a with a rotor on shaft 10 having two axially spaced rotor components spaced by air gaps from the ring 15a and presenting the electroconductive rings 16–17 backed by ferrous rings 18019 on opposite sides of the magnets.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A power transfer assembly comprising:
   first and second rotary shafts having respective first and second rotary axes which are parallel and laterally spaced apart, said shafts being independently supported;
   a magnet rotor and a conductor rotor mounted on said first and second shafts, respectively;
   said conductor rotor having two axially spaced conductors which are centered relative to said second rotary axis and are arranged to travel in parallel-spaced circular conductor orbits, said conductors being of a nonmagnetic material with good electroconductivity, and said conductor rotor having a central generally circular opening which is radially inward of one of said conductors and has a radius greater than the sum of the lateral distance between said rotary axes and the radius of said first shaft;
   said first shaft extending through said opening and being spaced from said second shaft;
   said magnet rotor having permanent magnets with axially facing poles which are arranged to travel two parallel-spaced circular magnet orbits overlapped in part by respective of said conductor orbits, said magnet orbits being smaller in diameter than said conductor orbits; and
   said poles being spaced by equal air gaps from respective ones of said conductors.

2. A power transfer assembly according to claim 1 in which said magnet rotor is located entirely outward of said second rotary axis.

3. A power transfer assembly according to claim 1 in which a second magnet rotor like the first mentioned magnet rotor is mounted on a third rotary shaft parallel to said first and second shafts, said second magnet rotor also having permanent magnets with axially facing poles arranged to travel in two parallel-spaced orbits overlapped in part by respective of said conductor orbits.

4. A power transfer assembly according to claim 3 in which said magnet rotors have teeth around their circumference meshing with an idler gear between the magnet rotors.

5. A power transfer assembly according to claim 1 in which said conductors are electroconductive rings which are backed by ferrous rings.

6. A power transfer assembly according to claim 1 in which the rotary axis of said conductor rotor extends through said magnet rotor.

7. A power transfer assembly comprising:
   a first shaft having a first rotary axis;
   a second shaft having a second rotary axis;
   a conductor rotor mounted on said first shaft and having a plurality of pairs of electroconductive rings centered on said first rotary axis and surrounding said second rotary axis in outwardly spaced relation with respect to said second axis, the rings in each said pair being spaced apart; and
   magnet rotors mounted on said second shaft and each partly interleaved with a respective one of said pairs of electroconductive rings, each of said magnet rotors having permanent magnets extending therethrough each with its opposite poles facing a respective one of said electroconductive rings and spaced by an air gap therefrom when the magnet occupies a position between a respective pair of the electroconductive rings during rotation of the rotors, and alternate of the magnets on each magnet rotor having their poles reversed.

8. A power transfer assembly according to claim 7 in which said first and second rotary axes are in spaced parallel relation to one another.

9. A power transfer assembly according to claim 7 in which said first shaft has a back end and said second shaft is located rearwardly of said back end.

* * * * *